United States Patent
Elarde et al.

(10) Patent No.: US 7,561,299 B2
(45) Date of Patent: Jul. 14, 2009

(54) PERSONALIZED GIFT CARDS FOR IMAGING PRODUCTS AND SERVICES

(75) Inventors: Peter Charles Elarde, Newark, CA (US); Patrick C. Teo, San Mateo, CA (US); Russ Ennio Muzzolini, San Carlos, CA (US); Jeannine Marie Smith, Menlo Park, CA (US); Xin Wen, Palo Alto, CA (US)

(73) Assignee: Shutterfly, Inc., Redwood City, CA (US)

( * ) Notice: Subject to any disclaimer, the term of this patent is extended or adjusted under 35 U.S.C. 154(b) by 1434 days.

(21) Appl. No.: 10/289,013

(22) Filed: Nov. 6, 2002

(65) Prior Publication Data

US 2005/0275870 A1 Dec. 15, 2005

(51) Int. Cl.
*G06F 15/00* (2006.01)
*G06F 3/12* (2006.01)

(52) U.S. Cl. .................................. 358/1.7; 358/1.18

(58) Field of Classification Search ............... 358/1.1, 358/1.7, 1.9, 1.13, 1.14, 1.15, 1.17, 1.18, 358/474
See application file for complete search history.

(56) References Cited

U.S. PATENT DOCUMENTS

| | | | |
|---|---|---|---|
| 5,457,904 A | 10/1995 | Colvin | |
| 5,984,174 A * | 11/1999 | Kato et al. | 235/375 |
| 6,269,341 B1 | 7/2001 | Redcay, Jr. | |
| 6,453,300 B2 * | 9/2002 | Simpson | 705/26 |
| 2001/0010772 A1 | 8/2001 | Nakajima | |
| 2002/0138363 A1 * | 9/2002 | Karas et al. | 705/26 |

* cited by examiner

*Primary Examiner*—Gabriel I Garcia
(74) *Attorney, Agent, or Firm*—Xin Wen

(57) ABSTRACT

A method for producing a gift card for a gift imaging product, comprises receiving an order of the gift imaging product from a user, producing the gift imaging product, producing the gift card by the user for the gift imaging product; and consolidating the gift card with the gift imaging product into one package.

23 Claims, 4 Drawing Sheets

PERSONALIZED GIFT CARDS FOR IMAGING PRODUCTS AND SERVICES

The present invention is related to commonly assigned U.S. patent application Ser. No. 09/436,704, filed on Nov. 9, 1999, titled "Distributing Images to Multiple Recipients", U.S. patent application Ser. No. 09/450,075, filed on Oct. 27, 1999, titled "Printing Images in an Optimized Manner", U.S. patent application Ser. No. 09/428,871 filed Oct. 27, 1999, titled "Multi-Tier Data Storage System", U.S. patent application Ser. No. 09/721,484, filed on Nov. 22, 2000, titled "User Interface and Methods for On-line Print Service", U.S. patent application Ser. No. 09/450,804, filed on Nov. 29, 1999, titled "Image Uploading", U.S. patent application Ser. No. 09/560,609, filed on Apr. 28, 2000, titled "System and Method of Providing a User Interface for Changing Attributes of an Image-based Product", U.S. patent application Ser. No. 09/684,595, filed on Oct. 5, 2000, titled "Previewing a framed image print", U.S. patent application Ser. No. 10/106,902, filed on Mar. 25, 2002, titled "Producing and sharing personalized photo calendar", and U.S. patent application Ser. No. 10/185,862, filed Jun. 28, 2002, titled "Personalized photo greeting cards". The disclosures of these related applications are incorporated herein by reference.

TECHNICAL FIELD

This application relates to producing and distributing personalized gift cards for gifts.

BACKGROUND

Gift cards are typically printed with static designs and in large quantities. They can commonly be purchased at retail locations such as card stores, bookstores, and so on. After a user purchases the gift cards, she can handwrite messages on the gift cards and use them when she gives gifts to family members, friends, or business clients. Card printing vending machines have been developed to allow the card purchasers to select card designs and input their own personalized messages before the actual cards are printed.

In recent years, online photo services such as Shutterfly, Inc., based at Redwood City, Calif., have established services for users to upload, store and share their digital photo images. The users can order physical photo products such as photographic prints, photo books, frames, calendars, CD's, frames, and greeting cards, etc. The print orders are fulfilled using automated digital printers, and shipped to the recipients as specified by the user. Customers of the online photo services often order the photo products as gifts to others.

SUMMARY

Methods and apparatus for producing gift cards for gift products are disclosed. In one embodiment, a user orders a gift product and a gift card for the gift product. The gift card can be personalized by including the user's personalized message and images. The gift card is sent to the recipient of the gift product.

In one aspect, a method for producing a gift card for a gift imaging product, comprising: a) receiving an order of the gift imaging product from a user; b) producing the gift imaging product; c) producing the gift card by the user for the gift imaging product; and d) consolidating the gift card with the gift imaging product into one package.

In another aspect, the gift imaging product and the gift card are ordered by a user at a computer terminal from an online photo service website. The server of the website is remote to the computer terminal. Alternatively, the gift imaging product and the gift card are ordered at a retail location. A user or an operator of the retail business can enter the ordering information personalization information for the gift imaging product and the gift card.

In yet another aspect, the present invention provides a gift product including an imaging product ordered by a user for a recipient and a gift card printed by a digital printer. The gift card includes digitally printed message or image that is provided by the user. The imaging product and the gift card are enclosed in a shipping package to be shipped to the recipient.

In still another aspect, the present invention provides a method for producing a gift card for a gift service, comprising: a) receiving an order of the gift service from a user for a recipient; b) producing the gift card for the gift service, wherein the gift card includes personalized information provided by the user; and c) sending the gift card and information about the gift service to the recipient.

An advantage of the present invention is that personalized and occasion-specific information can be entered and printed on the gift card when the information about the gift product, the recipient, and the occasion of the gift are known.

Another advantage of the present invention is that the personalized gift card can be ordered remotely from an online service or a retail site at the time a user orders the gift itself. The present invention is applicable to both consumer and business users.

Yet another advantage of the invention is that an image of the gift product can be printed on the gift card. Thus the recipient can visualize the product or the service of the gift before he receives the gift product or uses the gift service.

The details of one or more embodiments are set forth in the accompanying drawings and in the description below. Other features, objects, and advantages of the invention will become apparent from the description and drawings, and from the claims.

DRAWING DESCRIPTIONS

DETAILED DESCRIPTION

Figure 1:
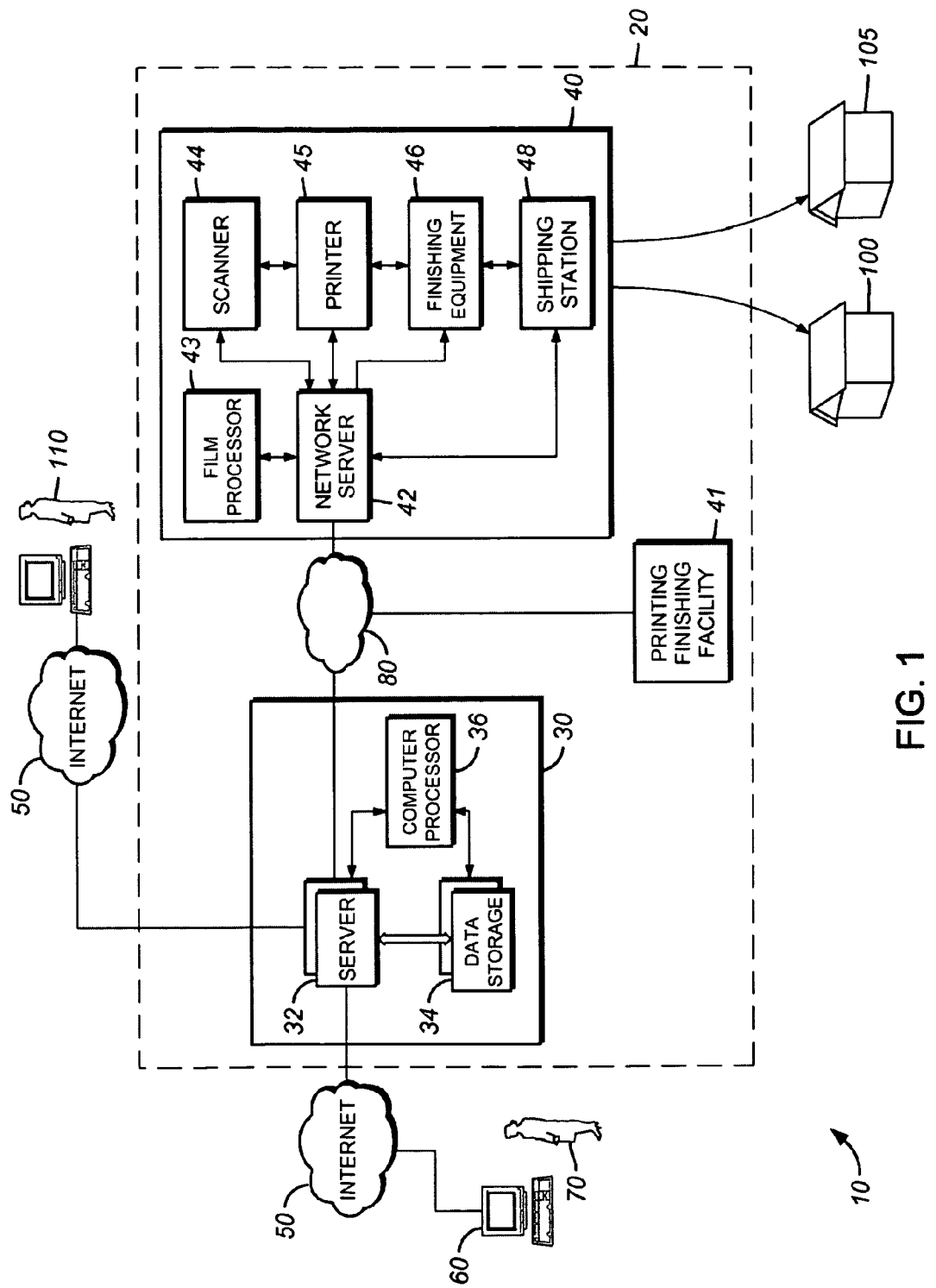
FIG. 1 is a block diagram of a system for producing personalized gift cards for gift products in accordance with the present invention.

FIG. 1 shows a block diagram of the system 10 for producing personalized gift cards in accordance with the present invention. An online photo system 20 is established by a photo service provider to provide photo services on a wide area network such as the Internet 50. The online photo system 20 includes a data center 30 and one or more printing and finishing facilities 40 and 41.

In accordance with the present invention, the term "personalized" is used in personalized information, personalized message, personalized image, and personalized design, etc. The term "personalized" refers to the information that is specific to the recipient, the user, the gift product, or the intended occasion. In other words, "personalized" information is "individualized" or "customized", and is not generally applicable to all gift products.

The data center 30 includes one or more servers 32, data storage devices 34 for storing image data, user account and order information, and one or more computer processors 36 for processing orders and rendering digital images. An online-photo website is powered by the servers 32 to serve as a web interface between the users 70 and the photo service provider. The users can order photo products from the web interface. The printing and finishing facilities 40,41 produces the ordered photo products such as photographic prints, greeting cards, photo albums, photo calendars, photo books, photo T-shirt, photo mugs, record images on compact disks (CDs), and framed photo prints. In accordance with the present invention, the greeting cards include folded greeting cards, postcards, trading cards such as baseball cards or game cards, and other form of cards. The users 70 can personalize their greeting cards by including an image uploaded from the website.

The architecture of the data storage devices 34 is designed to optimize the data accessibility, the storage reliability and the cost. Further details on the image data storage in online photo system 20 are provided in the commonly assigned and above referenced U.S. patent application Ser. No. 09/428,871 filed Oct. 27, 1999, titled "Multi-Tier Data Storage System", which is incorporated herein by reference.

The printing and finishing facilities 40,41 can be co-located at the data center 30. Alternatively, the printing and finishing facility 40,41 can be located remotely from the data center 30. Multiple printing and finishing facilities 40,41 can be set up so that each printing and finishing facility 40,41 can be located geographically close to a large population of customers to shorten order delivery time. Furthermore, the printing and finishing facilities 40,41 and the data center 30 can be owned and operated by different business entities. For example, the data center 30 can be owned by a first business entity that hosts a website that provides a web front and web user interface for the user 70. The printing and finishing facilities 40,41 can be owned by a second business entity that fulfills the photo product orders that are received from the data center 30. In this articular arrangement, the second business entity is often referred as an Application Service Provider (ASP). The photo service provider can provide services to its customers from its own website, as well as fulfill (i.e. ASP) photo products for websites hosted by other business entities.

The printing and finishing facility 40 includes network servers 42 for communicating with the data center 30, printers 45 for printing images on physical surfaces, finishing equipment 46 for operations after the images are printed, and shipping stations 48 for confirming the completion of the orders and shipping the ordered photo products to recipients 100 and 105 (the user 70 can be a recipient). The printers 45 are digital printers that takes digital data input and produces images on a receiver including natural paper or synthetic materials. Examples of printer 45 include can be digital photographic printers such as Fuji Frontier Minilab printers, Kodak DLS minilab printers, Gretag CYRA FastPrint digital photo printer, or Kodak I-Lab photo printers. The printers 45 can also include offset digital printers or digital printing presses such as HP Indigo UltraStream 2000 digital printing press, Xerox's DocuColor printers etc. The printers 45 can also include large format photo or inkjet printers for printing posters and banners. The printing and finishing facilities 40,41 can include a film processor 43 for processing exposed films, and a scanner 44 for digitizing a processed film stripe.

Figure 4:
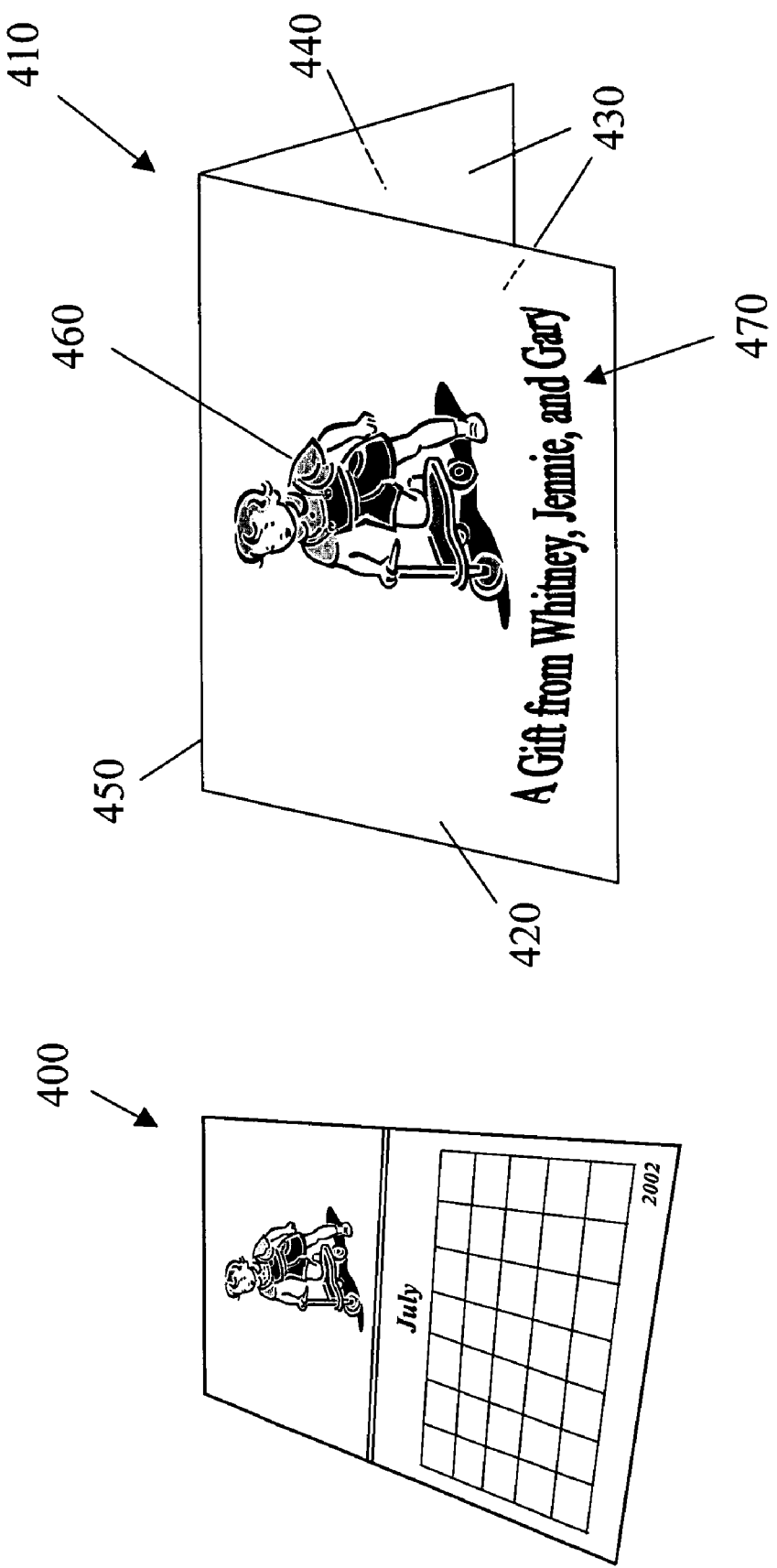
FIG. 4 is a perspective view of a folded gift card for a photo calendar that is ordered as a gift product.

The network servers 42 are connected with the data center 30 via a computer network 80 such as a Local Area Network or a Wide Area Network. The order information and image data can be transferred from servers 32 to the network servers 42 using a standard or a proprietary protocol (FTP, HTTP, among others). The finishing equipment 46 can perform any operations for finishing a complete photo product other than photo printing such as cutting, folding, adding a cover to photo book, punching, stapling, gluing, binding, envelope printing and sealing, packaging, labeling, weighing and postage metering. The finishing operations can also include framing a photo print, recording image data on a CD-ROM, etc. Furthermore, the printers and the finishing equipments can be located in different sites. Some finishing operations can be fulfilled by an external contractor. More detailed workflow for producing folded greeting cards is illustrated in FIG. 4.

Figure 2:
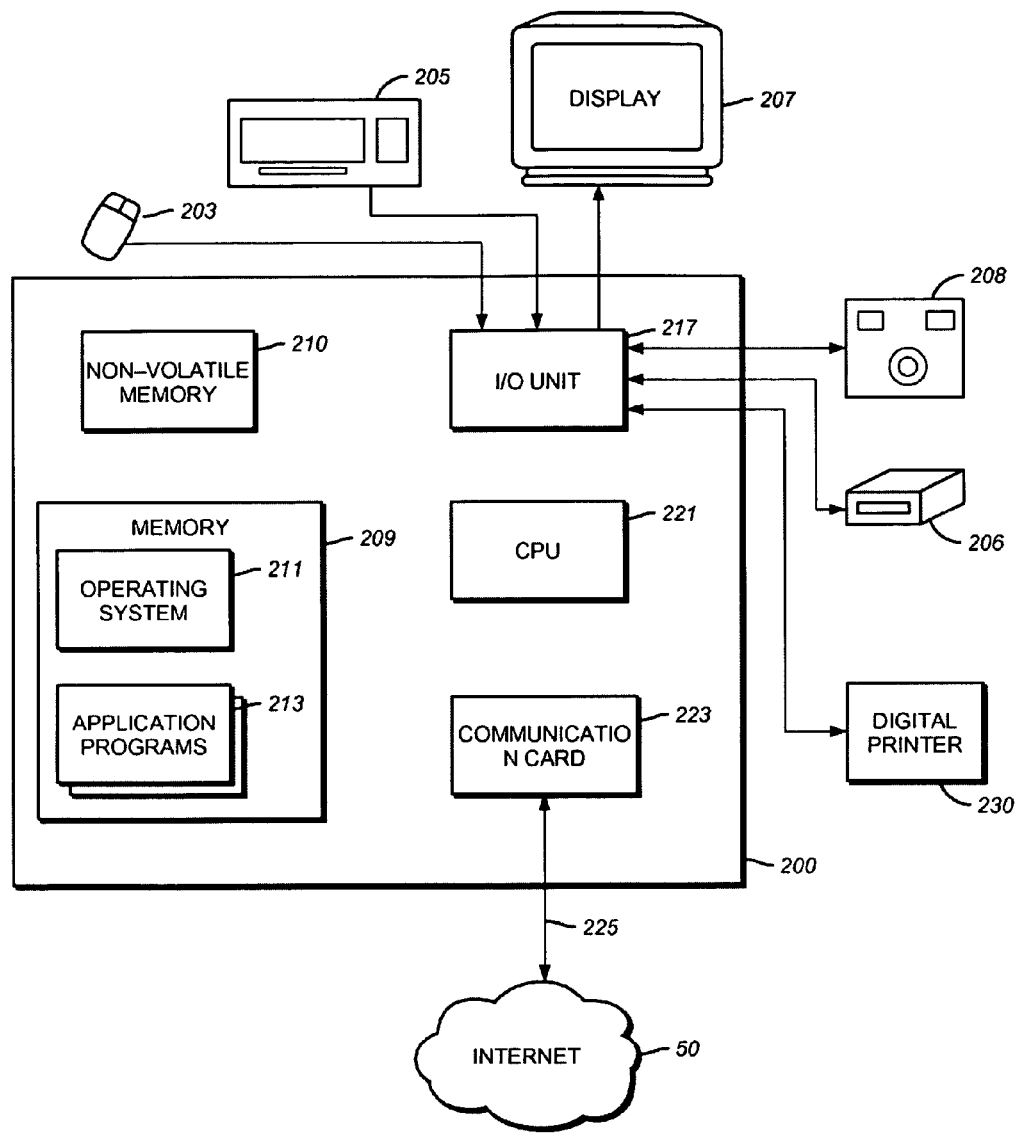
FIG. 2 shows a typical computer that a customer uses for receiving digital image data from a digital image capture device and for accessing a photo hosting website on the Internet.

A user 70 can access the online-photo website using a computer terminal 60 as shown in FIG. 2. The computer terminal 60 can be a personal computer located at a home or at a business, or a public entry terminal such as a kiosk. The computer terminal 60 allows a user 70 to execute software to perform tasks such as communicating with other computer users, accessing various computer resources, and viewing, creating, or otherwise manipulating electronic content, that is, any combination of text, images, movies, music or other sounds, animations, 3D virtual worlds, and links to other objects. Exemplary components of the computer terminal 60, shown in FIG. 2, include input/output (I/O) devices (mouse 203, keyboard 205, display 207) and a general purpose computer 200 having a central processor unit (CPU) 221, an I/O unit 217 and a memory 209 that stores data and various programs such as an operating system 211, and one or more application programs 213 including applications for viewing, managing, and editing digital images (e.g., a graphics program such as Adobe Photoshop). The computer 200 also includes non-volatile memory 210 (e.g., flash RAM, a hard disk drive, and/or a floppy disk, CD-ROM, or other removable storage media) and a communications device 223 (e.g., a modem or network adapter) for exchanging data with an Internet 50 via a communications link 225 (e.g., a telephone line).

In accordance with the present invention, the computer 200 allows the user 70 to connect to the online-photo website using the communications card or device 223. The user 70 can set up and access her personal account. The user 70 can enter user account information such as the user's name, address, payment information (credit card number), and information about the recipient of the photo products ordered by the user 70. The user 70 can also enter payment information such as credit card number, the name and address on the credit card etc. The user 70 can also send (i.e. upload) digital image data to the online-photo website. In accordance with the present invention, the user can store the images in an online photo album, create personalized gift card at the web user interface, and order a personalized gift card and a gift product for specified recipients 100 and 105.

The computer 200 of FIG. 2 can also be connected to various peripheral I/O devices such as an image capture device (digital camera, film scanner or reflective scanners). One such peripheral device is a digital camera 208 that enables users to take pictures and save them in digital (electronic) format. Typically, the digital camera 208 is connected to the computer 200 only while the user is transferring images to the computer's disk drive or other non-volatile memory 210. The digital camera 208 can be connected to the computer 200 using a Firewire or an USB port, from a camera cradle (e.g. Kodak DX3900 using an EasyShare Camera Dock), or over wireless media such as radio or optical medium. The digital images captured by a digital camera are typically stored in memory card (e.g., SmartMedia™ or CompactFlash™) that are detachable from the digital camera. The digital images on a memory card can be transferred to the computer 200 using a card reader 206 and saved on non-volatile memory 210.

The user 70 can also obtain digital images from film-based prints from a traditional camera, by sending an exposed film into a photo-finishing service, which develops the film to make prints and/or scans (or otherwise digitizes) the prints or negatives to generate digital image files. The digital image files then can be downloaded by the user or transmitted back to the user by e-mail or on a CD-ROM, diskette, or other removable storage medium. The users can also digitize images from a negative film using a film scanner that is connected to the computer 200 or from a reflective image print using a scanner. Digital images can also be created or edited using an application program 213 (e.g., a graphics program such as Adobe Photoshop).

Once the digital images are stored on the computer 200, a user can perform various operations on them using application programs 213 stored in memory 209. For example, an image viewer application can be used for viewing the images and a photo editor application can be used for touching up and modifying the images. In addition, an electronic messaging (e.g., e-mail) application can be used to transmit the digital images to other users. In accordance with the present invention, one of the application programs 213 can enable the user 210 creating a personalized gift card on the computer 200. Several of the above described imaging functions can be incorporated in one imaging software, which can be provided by the photo service provider and installed on computer 200 for the user 70. More details about application programs 213 for image enhancement and image management.

In addition to viewing the digital images on the computer display 207, the user 70 may desire to have physical photo products made of digital images. Photo prints can be generated by the user 70 using a digital printer 230 that is connected to the computer 200. Typical digital printers 230 can include such as an inkjet printer or a dye sublimation printer. The user 70 can also purchase photo products from the online photo service provider. In accordance with embodiments of the present invention, examples of such photo products may include personalized photo greeting cards, photo prints based on silver halide photographic paper (versus ink jet receiver used by ink jet printers), personalized gift cards, photo books and albums, photo T-shirt, and photo, mugs etc. The personalized gift cards can include users' photos and personalized text. The production of these photo products often require the use of commercial equipment which are usually only available at a commercial production location such as the printing and finishing facilities 40 and 41. One online photo service provider that makes such photo products is Shutterfly, Inc., located at Redwood City, Calif., U.S.A.

In accordance with the present invention, the user 70 can be a consumer that accesses the computer terminal 60 from home or a public entry terminal. The user 70 can also be a business owner or employee that may access the computer terminal 60 at a retail location such as a photo shop or a printing store. In the latter case, the digital images may be generated by a customer of the business and later provided the business for receiving an imaging service. An advantage of the present invention, as described above, is that it allows the business to provide photo products that are otherwise unavailable at the business location. For example, the production of personalized gift cards require commercial printing press and finishing equipment that are not typically available at retail business locations. The formats of communication between the computer terminal 60 and the servers 32 as well as the graphic user interface (as described below relating to FIGS. 3 through 7) can be customized for the consumer and commercial customers.

The computer terminal 60 can also be a public entry terminal such as a kiosk for receiving digital image data from the user 70 and uploading the digital images to the server 32. After the digital image files have been uploaded, the user can view, manipulate and/or order prints in the manners described above. The public entry terminal can also support various electronic payment and authorization mechanisms, for example, a credit or debit card reader in communication with a payment authorization center, to enable users to be charged, and pay for, their prints at the time of ordering.

A typical process of using an online photo service is now described. The user 70 sends digital images to the servers 32 provided by the online photo system 20 by uploading over the Internet 50 using a standard or a proprietary protocol (FTP, HTTP, XML, for example) or electronic communication application (for example, e-mail or special-purpose software provided by the photo-finisher). The user 70 can also send digital image data stored on a physical storage medium such as a memory card or recordable CD by US mail, overnight courier or local delivery service. The photo-finisher can then read the images from the storage medium and return it to the user, potentially in the same package as the user's print order. In addition, the photo service provider can load data or programs for the user's benefit onto the storage medium before returning it to the user. For example, the photo-finisher can load the storage medium with an application program 213 for the user to create a personalized gift card on his computer 200.

The user 70 can also send a roll of exposed film, and processed film negatives to the photo service provider. The exposed film is processed by the film processor 43 and digitized by the scanner 44 in the printing and finishing facilities 40, 41. The digital image data output from the scanner 44 is stored on the data storage 34.

After the photo service provider has received the user's digital images, the photo service provider can host the images on the online photo website, at which the user can view and access the images using a browser application. The user 70 accesses the online-photo website to designate which of the images should be reproduced on a photo product, parameters relating to printing (e.g., finish, size, number of copies), and one or more recipients 100, 105 to whom the photo products are to be sent.

In addition to hosting the user's images on a web page, the photo service provider usually stores the images in an image archive on in the data storage 34 so that the user 60 and others given authorization by the user (e.g. the share recipient 110) can access them in the future. The photo service provider can also provide sample images for the users to select for use online or producing a physical photo product.

After the user's images have reached the photo service provider and have been made available online, the user can place an order with the photo service provider. One way to place an order is by having the user 70 view the images online, for example, with a browser and selectively designate which images should be printed. The user can also specify one or more recipients 100,105 to whom prints should be distributed and, further, print parameters for each of the individual recipients, for example, not only parameters such as the size, number of copies and print finish, but potentially also custom messages to be printed on the back or front of a print.

The information stored in the data storage 34 is provided to a printing and finishing facilities 40,41 for making the photo products. The photo products include photographic prints, but also any other item to which graphical information can be imparted, for example, greeting or holiday cards, books, greeting cards, playing cards, T-shirts, coffee mugs, mouse pads, key-chains, or any other type of gift or novelty item. The photo products are printed by the printer 45 and finished by finishing equipment 46 according to the printing parameters as specified by the user 70. The photo products are then delivered to the specified recipients 100, 105 using standard U.S. Mail, or courier services such as Federal Express or UPS.

Further details on the generation and distribution of photo products using online photo system 20 are provided in the commonly assigned and above referenced U.S. patent application Ser. No. 09/436,704, filed on Nov. 9, 1999, titled "Distributing Images to Multiple Recipients" and U.S. patent application Ser. No. 09/450,075, filed on Oct. 27, 1999, titled "Printing Images in an Optimized Manner". The disclosures of these patent applications are herein incorporated by reference.

In recent years, many customers have begun to order image-based gift products from the online photo system 20, especially during the holidays. At the year-end Shutterfly users largely visit the service in search of personalized photo gifts and holiday cards. To make it easier for shoppers' to create personal holiday gifts, for example, online photo service Shutterfly provides a virtual one-stop shop (i.e. "the Shutterfly holiday boutique") that is a single destination that groups together the company's most popular customizable photo gifts in one easy-to-navigate location. The holiday boutique's gift offerings include customizable photo wall calendars, note cards, frames and prints, and Snapbooks—spiral-bound photo print collections that can be personalized with individual captions. All of the photo products can be enhanced with special effects and creative holiday borders, including themes for Christmas, Hanukkah, Kwanzaa, winter, and New Year's. The customers can get everything from stocking stuffers to high-end, heirloom-quality framed prints that will provide a lifetime of memories.

Figure 3:
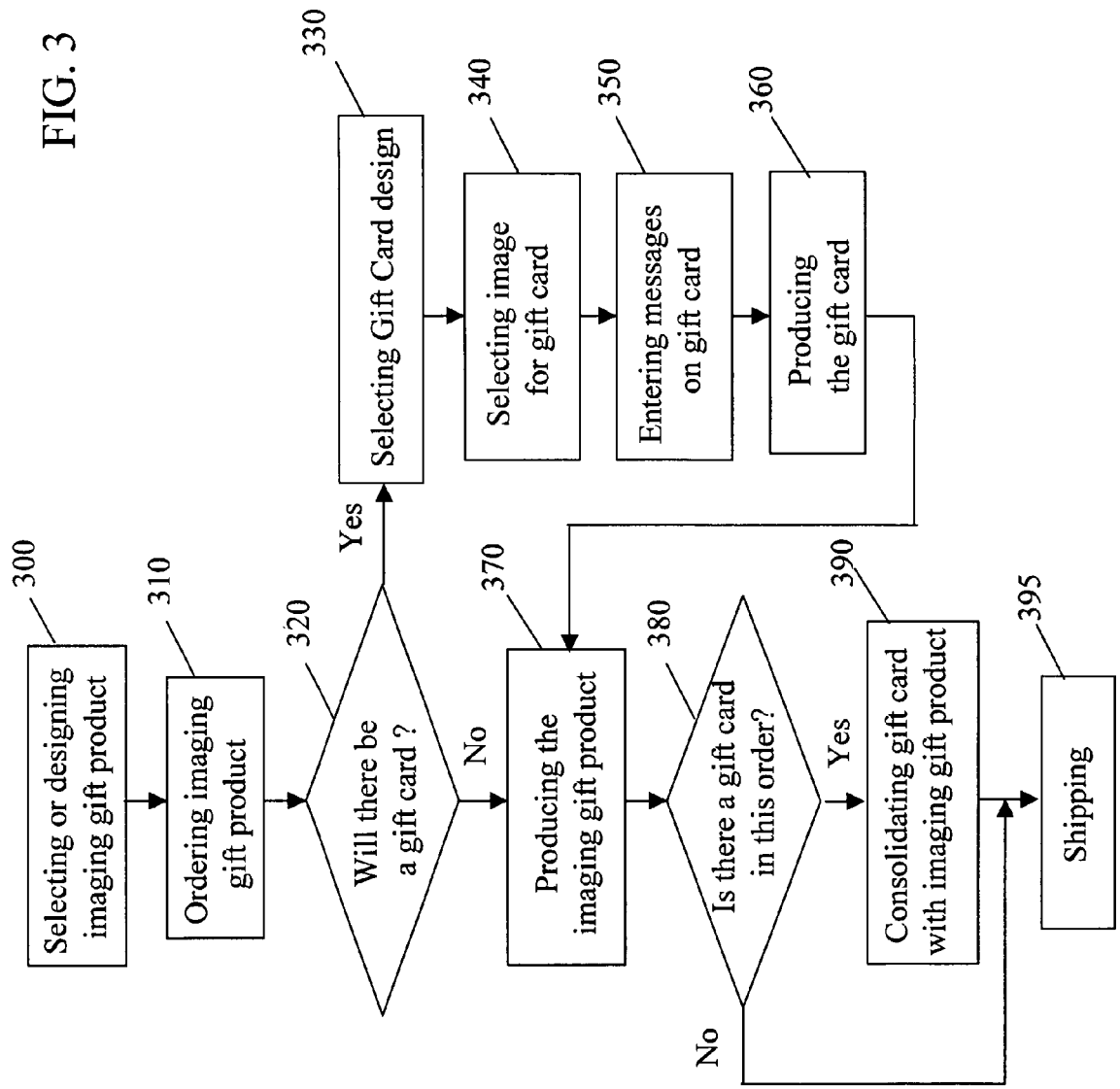
FIG. 3 is a flow diagram illustrating the steps of ordering and producing gift cards for a gift product.

In accordance with the present invention, a gift card can be created in accompany with the gift imaging products that a user 70 orders from online photo system 20. FIG. 3 is a flow diagram illustrating the steps of ordering and producing a gift card for an imaging gift product. A user 70 can select or design a gift product that is provided at the web site of online photo system 20 (box 300). The gift can be imaging related or non-imaging related. Imaging gift products can include various products that carry images or are associated with images, and that are also suitable for being given as gifts. For example, the imaging gift products can include different types of photo calendars, picture CDs, picture frames, photo albums, photo books, Holiday cards, greeting cards, note cards, playing cards, posters, banners, coffee mugs with images, T-shirt carrying images, mouse pads carrying images. Preferably, in accordance with the present invention an imaging gift product carry personalized images that are provided or selected by the user that orders the imaging gift product. An example of the imaging gift product is a personalized photo calendar 400 as shown in FIG. 4. Details of creating and ordering personalized photo calendars is disclosed in above referenced and commonly assigned U.S. patent application Ser. No. 10/106, 902, filed on Mar. 25, 2002, titled "Producing and sharing personalized photo calendar".

In accordance with the present invention, the imaging gift products can also include imaging devices such as digital or film cameras, video cameras, color or photo capable printers, scanners, digital camera card reader, memory cards for digital cameras, CD or DVD writers, receivers for color or photo capable printers, imaging supplies such as inks, printheads, thermal dye ribbon, or tone cartridges. It is understood that the present invention is also applicable to non-imaging gift products such as fruit baskets, flowers, candies, wines, gift certificates, shopping cards, game tickets for vacation resort, plane flights and cruises etc.

In accordance with another embodiment of the present invention, the imaging gift products can include a credit of a service or a product that a user orders for a recipient. For example, the gift ordered by a user 70 may be free credits for greeting cards and personalized photo calendars, offered by Shutterfly, Inc., located at Redwood City, Calif. The gift is intended for a recipient 100 to purchase customized photo products at Shutterfly, Inc.

After the imaging gift product(s) is selected or designed, the user 70 orders imaging gift product (box 310). The ordering process includes specifying copies of each imaging product and the name and address of one or more recipients 100,105 for the gift imaging products. For example, the personalized photo calendar 400 may be ordered by a user for the grand parents of her children before the holiday season. Details of creating and ordering personalized imaging products for one or more recipients are disclosed in the commonly assigned US patent applications cited at the beginning of the present patent application. The disclosures of these related applications are incorporated herein by reference.

Next, a decision is made whether a gift card 410 will be shipped in association with the gift imaging product (box 320). The decision can be made by a pre-determined rule set by the online photo system 20 or by the user 70. For example, the online photo system 20 can set the rule such that a gift card 410 is to be sent only when the recipient 100 for the gift image product is different from the user 70 or only for certain high-value imaging products. The gift card can also be an optional feature provided by the online photo system 20 that the user 70 can decide whether to send with the gift imaging product. The gift card can be free of charge or paid by the user 70.

A perspective view of a gift card 410 is shown in FIG. 4 in association with gift personalized photo calendar 400. The gift card 410 includes a front face 420, internal faces 430, and a back face 440. The two flaps containing the front face 420 and the back face 440 are separated by a central fold 450. The gift card 410 is typically in the dimensions of 3.5" by 5", 4" by 6", or 5" by 7" after folding. The front face 420 includes a design selected by the user 70 or a personalized image 460 provided by the user 70 from his photo album in his account on the web site (box 340). A border or a personalized message can be entered by the user 70 on the front face 420 (box 350). The internal faces 430 of the gift card 410 can also include personalized messages that the user 70 likes to send to the recipient of the gift product. The personalized messages 470 on the front face or internal faces may be related to the special occasion of the gift product is for: for example, holidays, baby births, birthdays, wedding, anniversaries etc. The front face 420 can also be customized by an image background or an image border selected or provided by the user to enhance the presentation of the gift card 410.

The personalized image 460 can also include a picture of the gift imaging product (or service). For example, the gift ordered by a user 70 may be a free credit for 100 greeting cards offered by Shutterfly, Inc., located at Redwood City, Calif. The gift is intended for a recipient 100 to use for the holiday season. The personalized image 460 can include a picture of the greeting cards that is offered by Shutterfly, Inc.

The personalized message 470 may describe the directions of logging onto Shutterfly website and using the credit for ordering the greeting cards.

The gift cards compatible with the present invention can take various different forms. For example, the gift card can include a single sheet with no fold (similar to a post card). The gift card may be printed on a cover paper stock by a 4-color (YMCK) digital color printer (or press), or on a photographic paper by a digital photographic printer, both available at Shutterfly, Inc.

The design and the personalization of the gift card 410 can be conducted by the user 70 at a web user interface to the online photo system 20. The layout of the gift card can also be varied by the user 70. The gift card 410 designed by the user 70 can be previewed and edited at the web user interface. The preview can be shown in two-dimensional layout or in perspective views. The gift cards completed can be saved as a project for the user 70 to reuse to save time in the future. Details of previewing and editing are disclosed U.S. patent application Ser. No. 09/721,484, filed on Nov. 22, 2000, titled "User Interface and Methods for On-line Print Service", U.S. patent application Ser. No. 09/560,609, filed on Apr. 28, 2000, titled "System and Method of Providing a User Interface for Changing Attributes of an Image-based Product", and U.S. patent application Ser. No. 09/684,595, filed on Oct. 5, 2000, titled "Previewing a framed image print". The disclosure of these related application is incorporated herein by reference.

After the user 70 is finished with the design of the gift card 410, the gift card 410 is produced in the lab box 360). The production of the gift card 410 may include steps such as printing, cutting, folding, and UV coating or lamination. Details of the workflow for producing personalized cards is described in the above referenced and commonly described U.S. patent application Ser. No. 10/185,862, filed Jun. 28, 2002, titled "Personalized photo greeting cards". The disclosure of these related application is incorporated herein by reference.

In accordance to the present invention, the gift card 410 can include personalized information provided by the user and non-personalized information. The non-customized information may include design pattern, company logo and so on. In one embodiment of the present invention, the personalized information and non-personalized information are printed simultaneously (box 360). Alternatively, gift cards having non-personalized information can be produced in quantities first. Personalized information can subsequently be printed on the gift card having the non-personalized information, after the user 70 provides personalized information (box 360).

Next, the gift imaging product is produced (370). The gift image products can include photo calendars, picture CDs, picture frames, photo albums, photo books, Holiday cards, greeting cards, note cards, playing cards, posters, banners, coffee mugs with images, T-shirt carrying images, many of which available at www.Shutterfly.com hosted by Shutterfly, Inc., located at Redwood City, Calif. In certain cases, the gift may be is a service or credit such as print credits the user 70 ordered for recipient 100, as described above. A physical gift certificate may be sent with the gift card rather than a physical gift product. Alternatively, the gift card can include information for using the gift service.

If a gift card is ordered for the produced gift imaging product in this order (380), the produced gift card 410 will be consolidated with the gift imaging product in one package (390), and shipped in the same package (395). The gift card is preferably printed with a machine-readable symbol such as a barcode, and/or visual alphanumerical symbols. The alphanumerical symbols may include order number for the gift imaging product, and/or the suborder numbers for the gift card. Similar symbols can also be printed on the cover of the gift products. The symbols can be used for matching the gift imaging product and the gift card in the consolidation of the gift card and the gift imaging product. Alternatively, a gift card 410 can be shipped in a different package as the imaging products (390).

In accordance to the present invention, different copies of the same gift product can be ordered for different recipients by a user 70. For example, a user 70 can order a family photo calendar for different family members. The user 70 can also order free-print certificates for a plurality of friends and family members. Ordering the same gift product and similar gift cards for different recipients can save significant ordering and design time for the user. Details of ordering product online are disclosed in the commonly assigned U.S. patent application Ser. No. 09/436,704, filed on Nov. 9, 1999, titled "Distributing Images to Multiple Recipients".

In accordance to another aspect of the present invention, the gift image product and the gift card 410 can be designed and ordered ahead of special events. The ordered gift image product, the gift card 410, shipping and recipient information are saved at the online photo system 20 such as Shutterfly, Inc., and are scheduled to be shipped to the specified recipient before the special events. In these situations, the gift card may include greeting messages for the special events in addition to any message or information associated with the gift product itself.

Various implementations of the systems and techniques described in this invention is also applicable to the retail locations (e.g. point of sales). The above described user interface for designing, selecting and ordering the gift and the gift card can be implemented on a computer local at the retail location. The ordering and personalization can be self helped by a customer or an operator at the retail location.

Various implementations of the systems and techniques described here may be realized in digital electronic circuitry, or in computer hardware, firmware, software, or in combinations thereof. A system or other apparatus that uses one or more of the techniques and methods described here may be implemented as a computer-readable storage medium, configured with a computer program, where the storage medium so configured causes a computer system to operate on input and/or generate output in a specific and predefined manner. Such a computer system may include one or more programmable processors that receive data and instructions from, and transmit data and instructions to, a data storage system, and suitable input and output devices. Each computer program may be implemented in a high-level procedural or object-oriented programming language, or in assembly or machine language if desired; and in any case, the language may be a compiled or interpreted language. Suitable processors include, by way of example, both general and special purpose microprocessors.

A number of embodiments have been described. Nevertheless, it will be understood that various modifications may be made without departing from the spirit and scope of the invention. For example, advantageous results still could be achieved if steps of the disclosed techniques were performed in a different order and/or if components in the disclosed systems were combined in a different manner and/or replaced or supplemented by other components. Accordingly, other embodiments are within the scope of the following claims.

Element Number List
10 system for producing personalized gift cards
20 online photo system
30 data center
32 server
34 data storage devices
36 computer processor
40 printing and finishing facility
41 printing and finishing facility
42 network server
43 film processor
44 scanner
45 printer
46 finishing equipment
48 shipping station
50 internet
60 computer terminal
70 user
80 computer network
100 recipient
105 recipient
110 share recipient
200 computer
203 mouse
205 keyboard
206 card reader
207 computer display
208 digital camera
209 memory
210 non-volatile memory
211 operating system
213 application program
217 I/O unit
221 Central Processing Unit (CPU)
223 communication device
225 communications link
230 digital printer
300 selecting or designing gift imaging product
310 ordering gift imaging product
320 Will there be a gift card?
330 selecting gift card design
340 selecting image for gift card
350 entering message on gift card
360 producing the gift card
370 producing the gift imaging product
380 Is there a gift card in this order?
390 consolidating gift card and gift imaging product
395 shipping
400 personalized photo calendar
410 gift card
420 front face
430 internal face
440 back face
450 fold
460 personalized image
470 personalized message

What is claimed is:

1. A method for producing a gift card in association with a gift imaging product, comprising:

receiving an order by a service provider from a first user over a computer network, wherein the order includes a gift imaging product and a gift card to be received by a second user as a gift from the first user;

producing the gift imaging product having a first machine-readable symbol;

producing the gift card that includes a credit for an image-based product, wherein the credit allows the second user to order the image-based product from the service provider;

printing a second machine-readable symbol on the gift card;

reading the first machine-readable symbol on the gift imaging product and the second machine-readable symbol on the gift card; and shipping the gift card with the gift imaging product in a common package to the second user if the reading of first machine-readable symbol and the second machine-readable symbol show that the gift imaging product matches to the gift card.

2. The method of claim 1, wherein the gift card includes a personalized message selected or provided by the first user for the second user.

3. The method of claim 1, wherein the gift card includes an image selected or provided by the first user.

4. The method of claim 3, wherein the image is a picture of the gift imaging product.

5. The method of claim 1, wherein the first machine readable code and the second machine readable code are encoded with an order number associated with the order.

6. The method of claim 1, wherein the gift imaging product includes personalized image or text information provided by the first user.

7. The method of claim 1, further comprising entering personalized information about the second user by the first user.

8. The method of claim 7, further comprising printing the personalized information and non-personalized information on the gift card.

9. The method of claim 1, wherein the order of the gift imaging product is submitted by the first user over the Internet.

10. The method of claim 1, wherein the gift imaging product and the gift card are ordered at a retail location.

11. The method of claim 1, wherein the step of producing the gift card includes:

printing personalized information by the user on a receiver; and folding the receiver to produce a folded gift card.

12. The method of claim 1, wherein the step of producing the gift card includes printing personalized information on a receiver comprising photosensitive materials.

13. The method of claim 1, wherein the gift imaging product includes an imaging service.

14. The method of claim 1, further comprising consolidating the gift card with the gift imaging product into the common package before the step of shipping.

15. The method of claim 1, further comprising ordering the image-based product by the second user using the credit in the gift card after the gift card is received by the second user.

16. A system for producing a gift card in association with a gift order, comprising:

a server operated for a service provider and configured to receive an order over a computer network from a first user, wherein the order includes a gift imaging product and a gift card to be received by a second user as a gift from the first user;

a printing and finishing facility configured to produce the gift imaging product printed with a first machine-readable symbol and to print the gift card that includes a second machine-readable symbol and a credit for an image-based product, wherein the credit allows the second user to order the image-based product from the service provider; and a shipping station configured to read the first machine-readable symbol on the gift imaging product and the second machine-readable symbol on the gift card, and to ship the gift card with the gift imaging product in a common package to the second user if the reading of first machine-readable symbol and the second machine-readable symbol show that the gift imaging product matches to the gift card.

17. The system of claim 16, wherein the gift card includes a personalized message selected or provided by the first user for the second user.

18. The system of claim 16, wherein the gift card includes an image selected or provided by the first user.

19. The system of claim 16, wherein the image is a picture of the gift imaging product.

20. The system of claim 16, wherein the first machine readable code and the second machine readable code are encoded with an order number associated with the order.

21. The system of claim 16, wherein the printing and finishing facility is configured to print personalized information and non-personalized information on the gift card.

22. The system of claim 16, wherein the printing and finishing facility is configured to print personalized information by the user on a paper substrate and fold the paper substrate to produce a folded gift card.

23. The system of claim 16, wherein the shipping station is configured to consolidate the gift card with the gift imaging product into the common package before the step of shipping.

* * * * *